Dec. 18, 1934.  A. J. MEYER  1,984,537
ENGINE
Filed Jan. 30, 1933
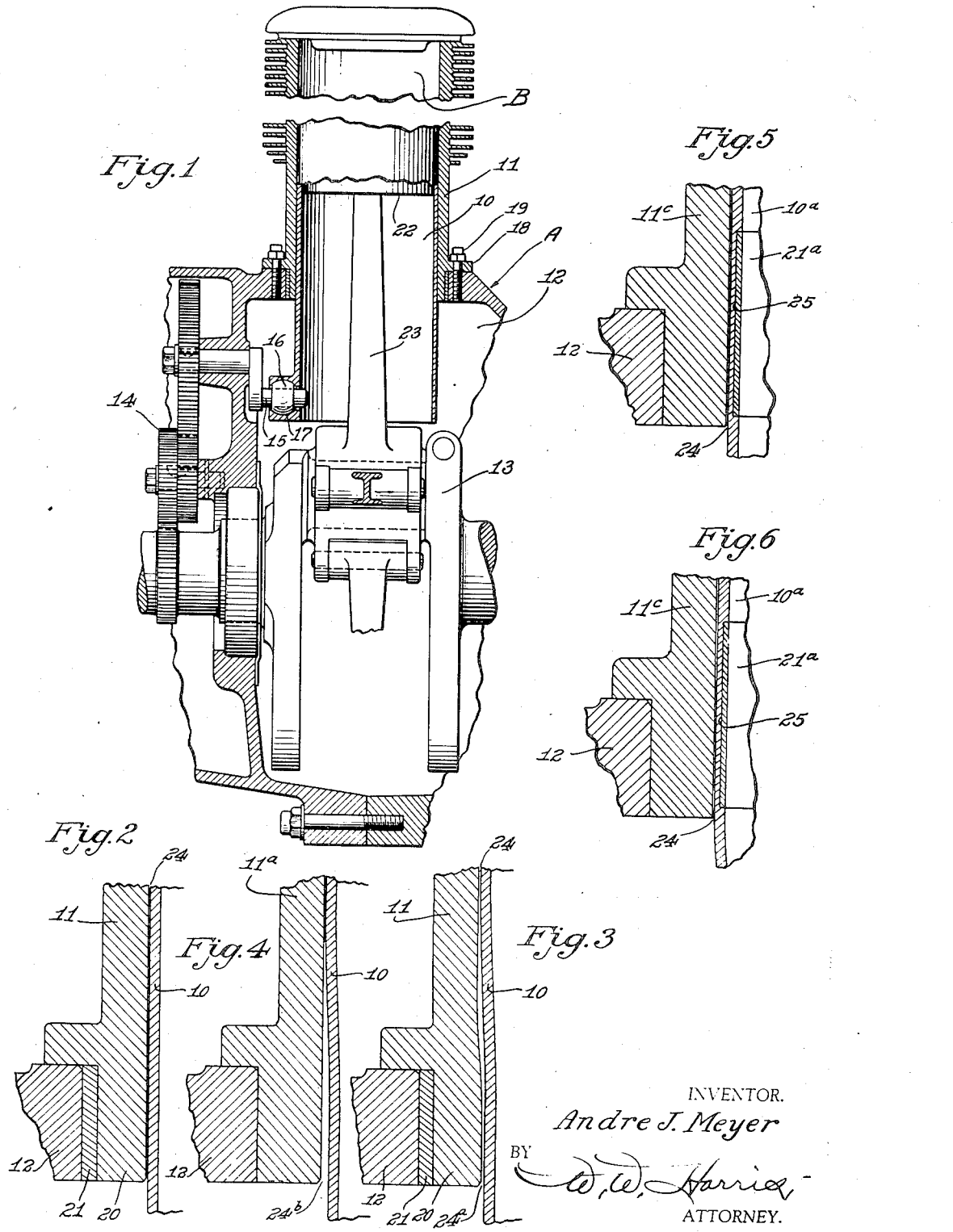
INVENTOR.
Andre J. Meyer
BY
ATTORNEY.

Patented Dec. 18, 1934

1,984,537

UNITED STATES PATENT OFFICE 1,984,537

ENGINE

Andre J. Meyer, Grosse Pointe Village, Mich., assignor to Continental Motors Corporation, Detroit, Mich., a corporation of Virginia Application January 30, 1933, Serial No. 654,224

20 Claims. (Cl. 123—81)

This invention relates to internal combustion engines and refers more particularly to engines of the sleeve valve type as distinguished from poppet valve types of engines.

Heretofore in engines of the aforesaid sleeve valve type, difficulty has been experienced by reason of excessive clearance occurring between the sleeve valve or sleeve valves and the associated cylinder. This excessive clearance is largely experienced in regions of the sleeve valve relatively remote from the combustion chamber and results in excessive oil pumping between the crank case and combustion chamber, loss of compression, excessive carbonization, and general engine inefficiency.

It is customary to arrange the parts so that the outer end of the sleeve is exposed to the combustion chamber, while the inner end is relatively remote therefrom, with the result that the outer end expands under the presence of heat much more than the inner end which is relatively cooler. The associated cylinder is usually of much greater cross-section than the sleeve valve so that the inner end of the cylinder is relatively hot by reason of good heat conductivity conditions from the outer end at the combustion chamber to the inner end. The sleeve, however, is usually made of relatively thin cross-sections to reduce its inertia factor and as a result heat is not conducted to the inner end as readily as the conditions encountered in the cylinder aforesaid. This results in a good working fit between the sleeve and cylinder at the outer or combustion chamber ends thereof, but excessive clearance at the inner ends thereof, since after the engine has been running, the inner end of the cylinder expands much more than the inner end of the sleeve. Therefore, even though the sleeve is fitted properly to the cylinder when the engine is "cold", the sleeve does not expand uniformly throughout its length when the engine becomes "hot", although the cylinder expands more nearly uniformly owing to its good heat conductivity as aforesaid.

The foregoing conditions are greatly aggravated when the cylinder is formed of aluminum or similar alloy having good heat conductivity, and wherein the sleeve is formed of steel or an alloy having relatively low heat conductivity.

It is an object of my invention to provide means for overcoming the aforesaid difficulties, whereby the inner and outer ends of the sleeve will maintain a good seal or fit with the cylinder under "hot" as well as under "cold" conditions of engine operation.

A further object of my invention resides in the provision of simple and inexpensive means for controlling and restricting the expansion of the inner end of the cylinder whereby to overcome the aforesaid difficulties.

In carrying out my invention, I have provided in the specific embodiment illustrated, a band secured around the inner end of the cylinder. This band is placed under tension as the cylinder tends to expand and restricts the expansion of the cylinder to the desired degree. If desired the band may be shrunk on the cylinder end under an initial tension whereby to increase its action in holding the cylinder end against undue expansion.

If desired, and by way of modification, the inner sleeve end or region thereof working at the inner cylinder end may be provided with a ring of suitable metal having relatively a high coefficient of expansion whereby to increase its expansion and maintain a fit with the cylinder. In the latter instance, the cylinder may or may not have the expansion controlling band aforesaid and the sleeve may be made somewhat heavier or of greater cross-section in order to receive the expansion band.

Referring to the accompanying drawing illustrating my invention,

Fig. 1 is a sectional elevation view through a typical view of my engine,

Fig. 2 is an enlarged detail sectional view of the inner end of the cylinder and sleeve when the engine is "cold", Fig. 3 is a corresponding view when the engine is "hot" showing in exaggerated form the action of my expansion controlling means for the cylinder, Fig. 4 is a corresponding view without the expansion controller illustrating the objectionable clearance developed when the engine is "hot", Fig. 5 is a corresponding view of a modification, illustrating the expansion controlling device applied to the sleeve, the engine being under a "cold" condition, and Fig. 6 is a view corresponding to Fig. 5 under conditions of "hot" engine operation.

In the drawing, A represents the engine herein illustrated as the radial air cooled cylinder type, although my invention is equally adapted to other types of engines having any arrangement of cylinders. The engine illustrated is the single sleeve valve type wherein a sleeve structure 10, operating in cylinder structure 11 is given a combined oscillating and reciprocating movement, well known in the art, in accomplishing the usual cyclical events of the engine. Any other form of sleeve valve operation, such as rotary or reciprocating may be employed if desired since my invention is not limited in its broader aspects to the provision of a sleeve of the combined movement type. Furthermore, a plurality of sleeve valves may be employed, if desired, as is customary in certain types of sleeve valve engines.

Engine A has a crankcase 12 housing the usual crankshaft 13, the latter driving suitable gearing 14 for operating a crank 15 and ball 16, the latter operating in the socket 17 carried by the sleeve 10 for driving the same as aforesaid. The crank 15 slides in the ball 16 and the latter moves in socket 17 to permit the sleeve movement as is well known in the art.

Cylinder 11 is secured to crankcase 12 by an annular flange 18 and fasteners 19; the inner cylinder end at 20 being fitted with a band 21 preferably shrunk on the cylinder. Where cylinder 11 is aluminum, the band 21 may be steel and where cylinder 11 is of iron or other material, the band may be formed of steel or an alloy of relatively low coefficient of expansion.

The usual piston 22 is connected by rod 23 to crankshaft 13, the combustion chamber B being located, as usual, above the piston within the outer portions of cylinder 11 and sleeve 10.

After the engine has been run, the outer portions of cylinder 11 and sleeve 10 expand radially as generally indicated in Fig. 3, substantially maintaining the clearance or fit 24 between the cylinder and sleeve, but the inner end of the sleeve tends to maintain its original or "cold" diameter of Fig. 2. This is shown exaggerated for illustration in Fig. 3 wherein the inner cylinder end 20 is prevented from undue expansion by the tension band 21 so as to maintain the desired clearance 24ᵃ between the inner cylinder end and portions of the sleeve operably associated therewith.

In Fig. 4 I have illustrated the objectionable clearance 24ᵇ heretofore experienced when cylinder 11ᵃ is not fitted with my improvements.

Referring to Fig. 5, the cylinder 11ᶜ may be conventional in that it is not fitted with my expansion controlling ring of Fig. 1, and in lieu thereof the sleeve 10ᵃ is fitted with an inserted band 21ᵃ at the location where expansion is desired to be effected. The band 21ᵃ may be of any suitable metal or alloy having a relatively high coefficient of expansion as compared to that of sleeve 10ᵃ whereby under the influence of engine heat the band 21ᵃ causes the portions of sleeve 10ᵃ associated therewith, to expand substantially with the expansion of the inner end of the cylinder 11ᶜ so as to maintain the desired clearance 24. The inner end of the sleeve may be left uncontrolled and may be permitted to find its normal diameter relatively smaller than that of the band 21ᵃ, as illustrated in exaggerated form in Fig. 6.

The band 21ᵃ may be cast in position, expanded into its sleeve receiving recess 25, or otherwise secured in place. The sleeve may be expanded by heating and the band 21ᵃ contracted by cooling in liquid air or other cooling medium to facilitate its installation. If desired, other portions of the cylinder and/or sleeve may be controlled according to the teachings of my invention or the sleeve and/or cylinder may be fitted with expansion controlling bands or the like for their entire working lengths as will be readily understood. Various other modifications will be apparent from my disclosure and it is not my intention to limit my invention to the particular constructions and arrangements of parts which I have shown and described for purposes of illustration.

What I claim as my invention is:

1. In an engine, a crankcase, a cylinder structure having an annular flange spaced outwardly from the inner end thereof, said flange being seated on said crankcase, a sleeve valve structure operably associated within said cylinder structure and having a portion thereof engaging the inner end of said cylinder structure inwardly of said flange, and a band fitted to one of said structures adapted to vary the normal expansion thereof under engine heat whereby to substantially maintain a predetermined clearance between said sleeve structure and said inner end of said cylinder structure.

2. In an engine, a cylinder structure, a sleeve valve structure operating within the cylinder structure, and a band fitted to one of said structures in the vicinity of the inner end of said cylinder structure whereby to maintain substantially uniform clearance at opposite ends of the cylinder.

3. In an engine, an aluminum cylinder structure, a sleeve valve structure operating within said cylinder structure and having a coefficient of expansion less than that of said cylinder structure whereby during engine operation excessive clearance tends to result between the cylinder and sleeve structures at the end of the cylinder structure opposite to that having the combustion chamber, and a metal band fitting one of said structures in the region of the first said cylinder end and adapted to restrict said excessive clearance tendency.

4. In an engine, a cylinder structure, a sleeve valve structure operably associated therewith, and a band associated with one of said structures for controlling expansion thereof.

5. In an engine, a cylinder structure, a sleeve valve structure operably associated therewith, and a band associated with one of said structures for controlling expansion thereof, said band being located in the region of the inner end of said cylinder structure.

6. In an engine of the sleeve valve type, a cylinder, sleeve valve means operable within said cylinder, and means including an element having a different co-efficient of expansion than said cylinder and acting on said cylinder to restrain expansion thereof under the influence of engine heat.

7. In an engine of the sleeve valve type, a cylinder, sleeve valve means operable within said cylinder, and means including an element having a different co-efficient of expansion than said cylinder and acting on the inner end of said cylinder to restrain expansion thereof under the influence of engine heat.

8. In an engine of the sleeve valve type, a cylinder, sleeve valve means operable within said cylinder, and a tension band surrounding said cylinder to restrain expansion thereof.

9. In an engine of the sleeve valve type, a cylinder, sleeve valve means operable within said cylinder, and a tension band surrounding the inner end of said cylinder to restrain expansion thereof.

10. In an engine of the sleeve valve type, a cylinder, sleeve valve means operable within said cylinder, and means including an element having a different co-efficient of expansion than said cylinder and acting on the inner end of said cylinder to restrain expansion thereof under the influence of engine heat, the outer portion of said cylinder being free to expand normally.

11. In an engine of the sleeve valve type, a cylinder, sleeve valve means operable within said cylinder, and a tension band surrounding the inner end of said cylinder to restrain expansion thereof, the outer end of said cylinder being free to expand.

12. In an engine of the sleeve valve type, a cylinder, a sleeve valve operating within the cylinder, said cylinder and sleeve tending to develop excessive clearance therebetween in a region relatively remote from the combustion chamber, and means including an element having a different co-efficient of expansion than said cylinder and acting on said cylinder at said region for restraining normal expansion thereof whereby to oppose said tendency for excessive clearance.

13. In an engine of the sleeve valve type, a cylinder, a sleeve valve operating within the cylinder, said cylinder and sleeve tending to develop excessive clearance therebetween in a region relatively remote from the combustion chamber, and a tension band acting on said cylinder at said region for restraining normal expansion thereof.

14. In an engine, a cylinder structure, and a tension band associated with said cylinder structure for restraining normal expansion thereof.

15. In an engine, a cylinder, a sleeve valve operably associated with said cylinder, and means including an element having a co-efficient of expansion different than that of the sleeve valve and carried by the sleeve valve for controlling expansion thereof.

16. In an engine, a cylinder, a sleeve valve operably associated with said cylinder, and means including an element having a co-efficient of expansion different than that of the sleeve valve and carried by the sleeve valve for increasing the normal expansion tendency thereof under the influence of engine heat.

17. A sleeve valve for use in engines, said sleeve having an element carried thereby and adapted to modify expansion of the sleeve when subjected to engine heat.

18. In an engine sleeve valve, a band forming a part thereof and adapted to modify expansion of the sleeve.

19. In an engine of the structure described, a cylinder structure, a sleeve valve structure operable within said cylinder structure, and expansion controlling means carried by one of said structures and responsive to temperature changes of said structures for modifying the normal relative expansion thereof.

20. In an engine of the structure described, a cylinder structure, a sleeve valve structure operable within said cylinder structure, and expansion controlling means carried by said cylinder structure and operable in response to temperature changes in said cylinder structure for modifying the normal relative expansion of said structures whereby to control the clearance between said structures.

ANDRE J. MEYER.